(12) United States Patent
Venkatesan et al.

(10) Patent No.: US 9,075,598 B2
(45) Date of Patent: Jul. 7, 2015

(54) PRODUCTIZED APPROACH FOR DEVELOPING MULTI INSTANCE SINGLE CODE BASE PRODUCT/APPLICATION WITH CENTRALIZED MANAGEMENT

(71) Applicant: HCL Technologies Limited, Chennai (IN)

(72) Inventors: Rajesh Venkatesan, Chennai (IN); Madhava Venkatesh Raghavan, Chennai (IN); Sezhiyan Navarasu, Chennai (IN)

( * ) Notice: Subject to any disclaimer, the term of this patent is extended or adjusted under 35 U.S.C. 154(b) by 0 days.

(21) Appl. No.: 13/941,497

(22) Filed: Jul. 14, 2013

(65) Prior Publication Data

US 2015/0020044 A1 Jan. 15, 2015

(51) Int. Cl.
*G06F 9/44* (2006.01)

(52) U.S. Cl.
CPC ... *G06F 8/30* (2013.01); *G06F 8/36* (2013.01)

(58) Field of Classification Search
CPC ........................................................ G06F 8/30
USPC .................................................. 717/106–123
See application file for complete search history.

(56) References Cited

U.S. PATENT DOCUMENTS

| 6,026,408 | A * | 2/2000 | Srinivasan et al. ..................... 1/1 |
| 7,546,577 | B2 * | 6/2009 | Do et al. ........................ 717/108 |
| 8,156,470 | B2 * | 4/2012 | Krueger et al. ............... 717/107 |
| 2005/0257192 | A1 * | 11/2005 | Chelle et al. .................. 717/108 |
| 2014/0173550 | A1 * | 6/2014 | Miles et al. ................... 717/104 |

OTHER PUBLICATIONS

Schilit, Bill, Norman Adams, and Roy Want. "Context-aware computing applications." Mobile Computing Systems and Applications, 1994. WMCSA 1994. First Workshop on. IEEE, 1994, pp. 85-90.*
Greenfield, Jack, and Keith Short. "Software factories: assembling applications with patterns, models, frameworks and tools." Companion of the 18th annual ACM SIGPLAN conference on Object-oriented programming, systems, languages, and applications. ACM, 2003, pp. 16-27.*
Cai, Xia, et al. "Component-based software engineering: technologies, development frameworks, and quality assurance schemes." Software Engineering Conference, 2000. APSEC 2000. Proceedings. Seventh Asia-Pacific. IEEE, 2000, pp. 372-379.*
Litiu, Radu, and Atul Parakash. "Developing adaptive groupware applications using a mobile component framework." Proceedings of the 2000 ACM conference on Computer supported cooperative work. ACM, 2000, pp. 107-116.*
Sprott, David. "Enterprise resource planning: componentizing the enterprise application packages." Communications of the ACM 43.4 (2000), pp. 63-69.*
Zhou, Nianjun, Liang-Jie Zhang, and Chih-Hong Wong. "Leveraging cloud platform for custom application development." Services Computing (SCC), 2011 IEEE International Conference on. IEEE, 2011, pp. 584-591.*

* cited by examiner

*Primary Examiner* — Satish Rampuria

(57) ABSTRACT

The embodiments herein relate to product/application customization and, more particularly, to develop multi instance single code base product/application with centralized management. The central repository present in the system fetches and holds all differentiation information for various instances of the application. Then the synchronization framework allows the differentiation data to be available to the individual instances. Further, the application archetype provides all the services needed to adhere to the principles of externalizing require facets of each instance and ensures the right configurations are fetched from the central repository. Finally, the application is executed with required configuration data.

10 Claims, 2 Drawing Sheets

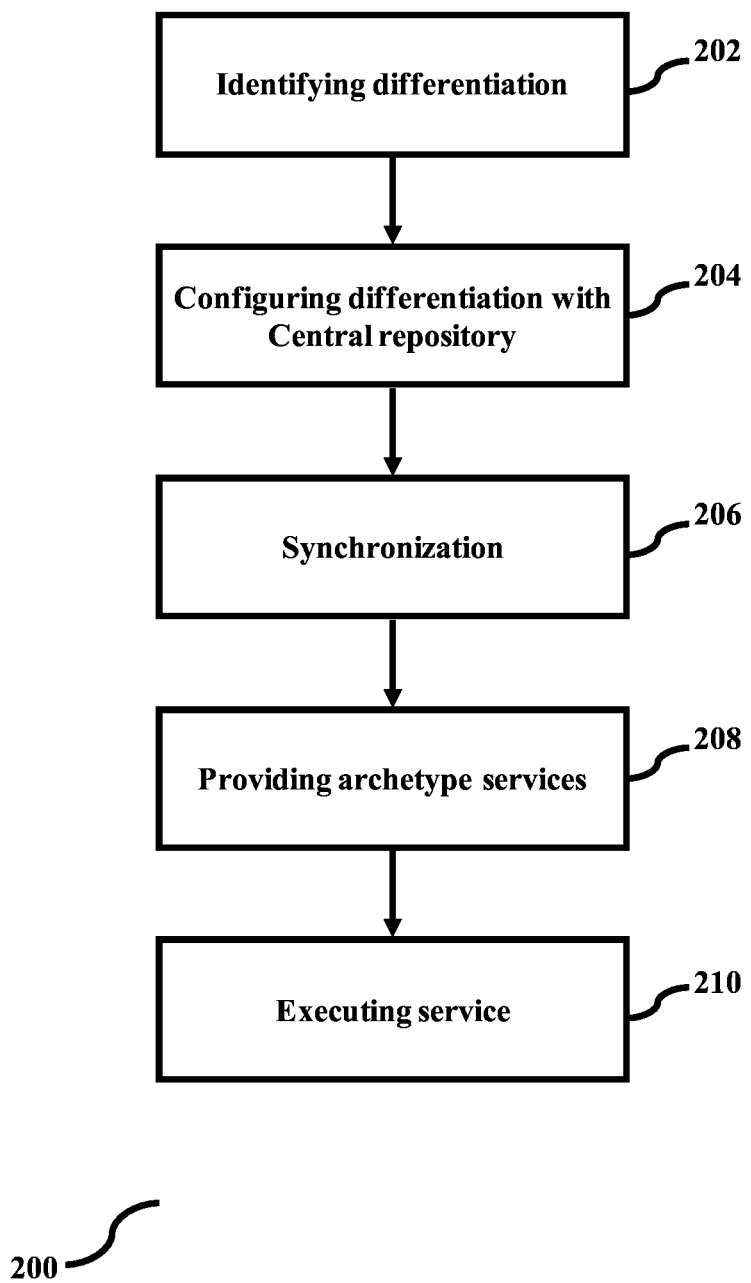

PRODUCTIZED APPROACH FOR DEVELOPING MULTI INSTANCE SINGLE CODE BASE PRODUCT/APPLICATION WITH CENTRALIZED MANAGEMENT

TECHNICAL FIELD

The embodiments herein relate to product/application customization and, more particularly, to develop multi instance single code base product/application with centralized management.

BACKGROUND OF EMBODIMENT

Traditionally applications/products that address a common business need but still have differentiation based on business partners, geographic conditions, individual needs and so on are catered to by multiple instances of the same product or application being customized as per local requirements. These differentiations are very complex to develop and manage for each instance. Further, the deployment of multiple instances of same product involve a phase of heavy differentiation according to the local needs where some of the instances are customized by writing additional code while others involve some type of configuration based on how mature the product or application is. Typically such applications or products involving multiple deployments that have been heavily customized according to local needs at some point, move away from the "commonality" of the original application so much as to be considered as a separate application in itself. In other cases, the products or applications are developed independently by individual business units/geographies/partners based on local requirements with no view of the global requirements and actually managed as separate applications or products.

Further more, while deploying an application or product to various business units or geographies or partners some of key challenges lies in changing local code of the application according to local needs, requiring a separate upgrade strategy for each instance and fragmentation of extended functionality because of non-standard way of customization and so on.

What is needed therefore is a system and method which develops multi instance single code base product/application with centralized management along with a synchronization frame work which automatically integrates centralized management system to the required application with necessary modifications.

SUMMARY OF EMBODIMENT

In view of the foregoing, an embodiment herein provides a method of providing instance based application customization services, the method comprises identifying a plurality of application facets to be differentiated corresponding to the instance; identifying individual differentiation of said instance corresponding to at least one of a plurality of parameters specific to said instance; configuring said identified plurality of application facets with a database; synchronizing at least one of the plurality of application facets with the instance; building an application archetype corresponding to the instance; and implementing the application archetype over the instance.

Embodiments further disclose a system for providing instance based application customization services, the system further configured for identifying a plurality of application facets to be differentiated corresponding to the instance, using a multi instance centralized management system; identifying individual differentiation of said instance corresponding to at least one of a plurality of parameters specific to said instance using said multi instance centralized management system; configuring said identified plurality of application facets with a database using said multi instance centralized management system; synchronizing at least one of the plurality of application facets with the instance using the multi instance centralized management system; building an application archetype corresponding to the instance using the multi instance centralized management system; and implementing the application archetype over the instance using the multi instance centralized management system.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which:

FIG. 2 is a flow diagram which shows various steps involved in the process of developing multi instance single code base product/application using the multi instance centralized management system, as disclosed in the embodiments herein.

DETAILED DESCRIPTION OF EMBODIMENTS

Figure 1:
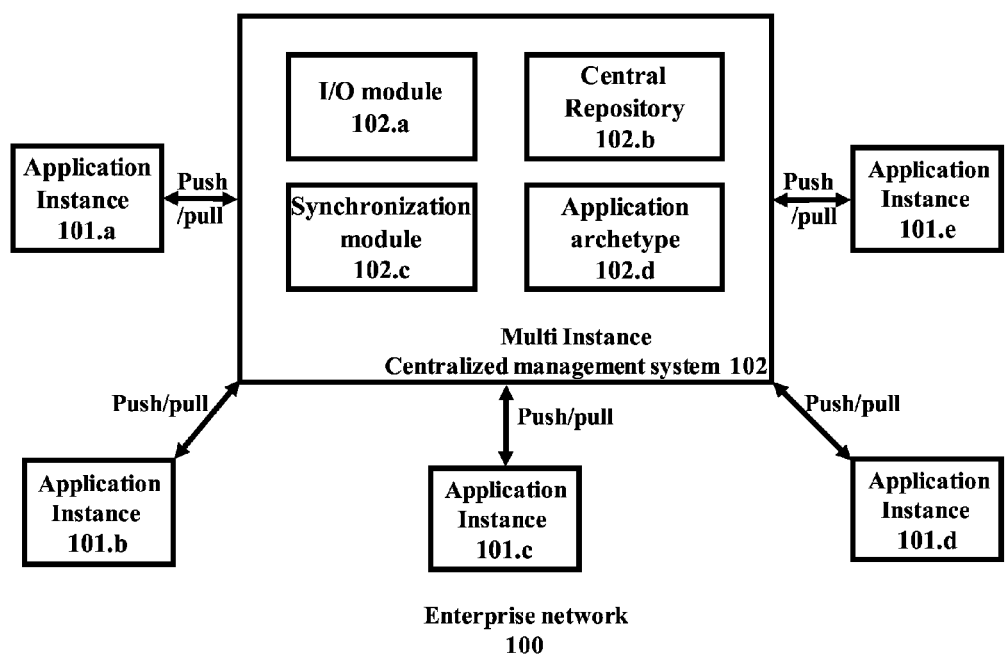
FIG. 1 illustrates a block diagram of Multi instance centralized management system, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method for developing multi instance single code base product/application by using a productization framework along with externalization of differentiated functionality and a synchronization frame work with centralized management. Referring now to the drawings, and more particularly to FIGS. 1 through 2, where similar reference characters denote corresponding features consistently throughout the figures, there are shown embodiments.

FIG. 1 illustrates a block diagram of Multi instance centralized management system, as disclosed in the embodiments herein. The system comprises a plurality of Application instances 101 and a Multi instance centralized management system 102. Further, Multi instance centralized management system 102 comprises of an Input/Output module 102.*a*, a central repository 102.*b*, a synchronization module 102.*c* and an application archetype 102.*d*.

The application instance 101 refers to any application model which may be designed considering various parameters such as location/geographic conditions, individual needs/requirements and so on. For example, let us take a global bank that wants to deliver the same product/application across geographies. Further, this application has local differentiation in workflow, rules, master data and localization based on geographies. Each instance corresponding to a particular geography type can be considered as an application instance. The multi instance centralized management system 102 may be set up within the enterprise network 100 which deploys same product at multiple instances.

The Input/Output module 102.a provides a suitable user interface such as keyboard, mouse and touch screen and so on for a user to enter the inputs required by the Multi instance centralized management system 102. The user can identify the differentiation required for the local instances based on the parameters such as geographic conditions, individual needs, and localization and so on. This can be done by means of a two level check list that is generated as part of the requirements, one capturing what parts of the application or product needs to be centrally managed (like master data, localization etc) and the other listing down each of the identified general areas like master data, localization data, workflow, rules, security, and entity extensions and drilling down to individual line items in each of these categories to arrive at the final list of differentiation in each of these categories among the various instances. Further, this information may be provided to the central repository 102.b through Input/Output module 102.a. The Input/Output module 102.a may also be used to provide outputs of the system to the user.

The central repository module 102.b fetches the differentiation information provided by the user through Input/Output module 102.a and thus creates a central repository that holds all differentiation information for the various instances of the application. This requires capturing the different instances of the application and associating the differentiation data for the various facets that were captured as part of the check list to the instances.

The synchronization module 102.c which has a synchronization framework allows the differentiation data to be available to the individual instances. There can be multiple models that are supported for the synchronization comprising:
 a) Real time pull
 b) Scheduled pull
 c) Real time push
 d) Scheduled push In Real time pull, differentiations which are configured in central repository 102.b are pulled to the instances whenever required where as in scheduled pull, differentiations are pulled on a scheduled basis from central repository 102.b. Further, in Real time push, central repository 102.b pushes the differentiations which are stored. Coming to the case of Scheduled push, central repository 102.b pushes the differentiations based on scheduled timings.

The application archetype 102.d of Multi instance centralized management system 102 integrates the central repository 102.b for behavior and provides "productization" services to the application created. Further, application archetype 102.d consists of re-usable, pre-configured services such as for data access (takes master data and entity differentiation into account for this instance), workflow (retrieve the correct workflow definition for this instance), reports (retrieves the configured set of reports for this instance), Rules (retrieves the correct set of rules for this instance) and so on for the application that gets built using this archetype. Further, the application archetype 102.d also integrates with the synchronization module 102.c of the central repository 102.b to abstract out the concern of differentiation data. The said application is built using the application archetype 102.d where the application archetype 102.d provides all the services needed to adhere to the principles of externalizing require facets and ensuring the right configurations are fetched from the central repository.

FIG. 2 is a flow diagram which shows various steps involved in the process of developing multi instance single code base product/application using the multi instance centralized management system, as disclosed in the embodiments herein. In order to handle all administration requirements from a centralized location, it becomes necessary to identify functions of the application or product which require differentiation at the local level which may include some parameters such as Master data, Localization data, Differentiation data including branding, workflow, rules, templates, integration and data model extensions, provisioning of users across various instances. This process involves identifying (202) the requirements for the local instances and arriving at what needs to be differentiated based on these requirements. This can be done by means of a two level check list that is generated as part of the requirements. For example, let us consider a global bank delivering the same application to different geographies that is to be delivered to end users with four instances say Application instance 101.a, Application instance 101.b, Application instance 101.c and Application instance 101.d. As part of first step, the differentiation information regarding each instance has to be identified. For application instance 101.a let the following table indicates required differentiation:

TABLE 1

| Application facet | Is differentiated(yes/no) |
|---|---|
| Master data | yes |
| Localization data | Yes |
| Workflow | Yes |
| Rules | Yes |
| Branding | No |
| Security | No |

In table 1, the information is captured about on what parts of application/product need to be centrally managed. For example, for the section workflow, differentiation is required and for security section it is not required.

Later to complete the first step, a final list has to be made by drilling down to individual line items in each of the categories identified such as master data, localization data, workflow, rules, security, and entity extensions and so on.

TABLE 2

| Workflow activity name | Is differentiated(yes/no) | Type of customization |
|---|---|---|
| Intiate order | Yes | New approval node |
| Intiate provisioning | Yes | Add new email to the sender list |
| Verify checklist | No | |
| Approve product | Yes | New approval node |

Table 2 shows the list of individual line items of entity work flow which is one of the application facet of the given application. Like this all the information regarding the instance is collected once and provided to the central repository 102.b through Input/Out module 102.

In an embodiment, it is also possible to group "common" instances logically together to form "Application Groups" where the group consists of instances containing common differentiation for management. For example, let us consider an business application which has four business units at different directions in a particular country say one at northern part, one at southern part, one at eastern part and other at western parts of the country in order to provide their services all over the country. But the differentiation required for each instances at all the parts of the country are one and the same, in such case, all the instances can be combined and a single Application group can be formed.

Now, all the information regarding application differentiation at different instances is configured (204) with the central repository 102.b. Further, synchronization module 102.c synchronizes (206) the differentiation data with instances and allows the differentiation data to be available to the individual instances. In an embodiment, the method of synchronizing differentiation data with instances can be done by Real time pull by the application where the data is pulled from the central repository 102.b as required, Scheduled pull by the application where the differentiation data is pulled on a scheduled basis from the central repository 102.b, Real Time Push by the central repository 102.b to the individual instances as and when data is modified or Scheduled Push to the individual instances by the central repository 102.b.

After forming central repository, whenever the application requires the configuration data, this is provided to the application by using the application archetype 102.d. Further, application archetype services are provided (208) which integrates into central repository 102.b for behavior and with synchronization module 102.c to abstract out the concern of differentiation data regarding particular instance. Later, application archetype 102.d provides productization services which are pre-configured for the particular application instance that gets built using this archetype. For example, the following diagram shows an application archetype for some particular application instance with its differentiated requirements:

| Application archetype |
|---|
| Work flow service |
| Reporting service |
| Rules service |
| Security services |
| Data services |
| Other services |

Finally, depending on the type of instance, application archetype 102.d dynamically selects the productization services from central repository 102.b with the help of synchronization module 102.c and the application is executed (210) with identified differentiated requirements. The various actions in method 200 may be performed in the order presented, in a different order or simultaneously. Further, in some embodiments, some actions listed in FIG. 2 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein specifies a system for developing multi instance single code base product/application. The mechanism allows centralized management along with a synchronization frame work which automatically integrates centralized management system to the required application with necessary modifications providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the embodiments may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method of providing instance based application customization services, said method comprising:
a multi instance single code base centralized management system, said product comprising:
identifying a plurality of application facets to be differentiated corresponding to said instance, by a central repository;
identifying individual differentiation of said instance corresponding to at least one of a plurality of parameters specific to said instance, by said central repository;
configuring said identified plurality of application facets with a database, by said central repository;
synchronizing at least one of said plurality of application facets with said instance, by a synchronization module, wherein said synchronization module is configured to make at least differentiation data available to said instance, further wherein said synchronization module is configured to support at least a real time pull model, a real time push model, a scheduled pull model and a scheduled push model;
selecting, in real time, a suitable application facet from said plurality of application facets, by said synchronization module;

sending said selected application facet to said instance, by an input/output module, wherein said sending is automatically initiated;

building an application archetype corresponding to said instance, by said central repository; and implementing said application archetype over said instance, by said central repository, wherein said application archetype consists re-usable, pre-configured services, workflow, reports, rules for said application being built using said application archetype, further wherein said application archetype provides services to adhere to external required facets and configurations are fetched from said central repository.

2. The method as in claim 1, wherein said configuring of said plurality or application facets with said database further comprises:

fetching at least one parameter related to said instance, from an input/output module; and fetching at least one differentiation data corresponding to said fetched parameter, from said input/output module.

3. The method as in claim 2, wherein said parameter is at least one of a geographical location and user requirements, by said input/output module.

4. The method as in claim 2, wherein said differentiation data corresponding to each instance is manually defined, by said input/output module.

5. The method as in claim 1, wherein said sending selected application facet to said instance is manually initiated by sending a request from said instance, by said input/output module.

6. A system for providing instance based application customization services, said system comprising:

a multi instance single code base centralized management system, said management system further comprising:

a hardware processor; and a memory comprising instructions, said instructions configured to cause said hardware processor to:

identify a plurality of application facets to be differentiated corresponding to said instance, by a central repository;

identify individual differentiation of said instance corresponding to at least one of a plurality of parameters specific to said instance, by said central repository;

configure said identified plurality of application facets with a database, by said central repository;

synchronize at least one of said plurality of application facets with said instance, by a synchronization module, wherein said synchronization module is configured to make at least differentiation data available to said instance, further wherein said synchronization module is configured to support at least a real time pull model, a real time push model, a scheduled pull model and a scheduled push model;

select, in real time, a suitable application facet from said plurality of application facets, by said synchronization module;

send said selected application facet to said instance, by said input/output module, said input/output module further configured to automatically send said selected application facet to said instance;

build an application archetype corresponding to said instance, by said central repository; and implement said application archetype over said instance, by said central repository, wherein said application archetype consists re-usable, pre-configured services, workflow, reports, rules for said application being built using said application archetype, further wherein said application archetype provides services to adhere to external required facets and configurations are fetched from said central repository.

7. The system as in claim 6, wherein said multi instance centralized management system is further provided with means for configuring said plurality of application facets with said database by:

an input/output module fetching at least one parameter related to said instance; and said input/output module fetching at least one differentiation data corresponding to said fetched parameter.

8. The system as in claim 7, wherein said input/output module is further configured to use at least one of a geographical location and user requirements as said parameter.

9. The system as in claim 7, wherein said input/output module is further configured to manually define differentiation data corresponding to each instance.

10. The system as in 6, wherein said input/output module is further configured to send said selected application facet to said instance upon receiving a request from said instance.

* * * * *